United States Patent
Caliri et al.

(10) Patent No.: US 7,636,046 B2
(45) Date of Patent: Dec. 22, 2009

(54) WIRELESS TRACKING SYSTEM AND METHOD WITH EXTREME TEMPERATURE RESISTANT TAG

(75) Inventors: Dyami Caliri, Encinitas, CA (US); Derek Smith, San Diego, CA (US)

(73) Assignee: Awarepoint Corporation, San Diego, CA (US)

( * ) Notice: Subject to any disclaimer, the term of this patent is extended or adjusted under 35 U.S.C. 154(b) by 0 days.

(21) Appl. No.: 12/477,142

(22) Filed: Jun. 3, 2009

(65) Prior Publication Data

US 2009/0231108 A1    Sep. 17, 2009

Related U.S. Application Data

(63) Continuation of application No. 12/325,030, filed on Nov. 28, 2008, now abandoned.

(60) Provisional application No. 60/991,683, filed on Nov. 30, 2007.

(51) Int. Cl.
*G08B 13/14* (2006.01)
*G08B 1/08* (2006.01)
*B60Q 1/00* (2006.01)
*H04Q 5/22* (2006.01)

(52) U.S. Cl. ............................. 340/572.1; 340/539.12; 340/449; 340/539.27; 340/10.33; 340/10.34

(58) Field of Classification Search ............... 340/572.1, 340/10.33, 10.34, 10.41, 10.5, 442, 447, 340/448, 449, 539.11, 539.12, 539.27, 870.17; 713/322, 323
See application file for complete search history.

(56) References Cited

U.S. PATENT DOCUMENTS

| | | |
|---|---|---|
| 5,424,048 A | 6/1995 | Riley |
| 6,037,879 A | 3/2000 | Tuttle |
| 6,255,949 B1 | 7/2001 | Nicholson et al. |
| 6,294,997 B1 | 9/2001 | Paratore et al. |
| 6,634,499 B2 | 10/2003 | Allen et al. |
| 6,712,276 B1 | 3/2004 | Abali et al. |
| 6,827,913 B2 | 12/2004 | Wood |
| 7,118,029 B2 | 10/2006 | Nycz et al. |

(Continued)

FOREIGN PATENT DOCUMENTS

JP    2007-026302 A    2/2007

(Continued)

OTHER PUBLICATIONS

Written Opinion of the International Searching Authority for International Application No. PCT/US2008/085069.

*Primary Examiner*—Daniel Wu
*Assistant Examiner*—Mark Rushing
(74) *Attorney, Agent, or Firm*—Clause Eight IPS; Michael Catania

(57) ABSTRACT

A wireless tracking system and method for real-time location tracking of an extreme-temperature sterilizable object is disclosed herein. The system and method utilize a tag attached to the extreme-temperature sterilizable object which includes a housing, a processor, a temperature sensor and a transceiver. If an internal temperature of the tag is detected by the temperature sensor, the tag enters a sleep mode. The temperature sensor periodically activates to determine if the internal temperature of the tag is within an acceptable operating range.

1 Claim, 8 Drawing Sheets

U.S. PATENT DOCUMENTS

| | | | |
|---|---|---|---|
| 7,231,531 B2 * | 6/2007 | Cupps et al. | 713/322 |
| 7,362,228 B2 * | 4/2008 | Nycz et al. | 340/572.1 |
| 7,454,640 B1 * | 11/2008 | Wong | 713/324 |
| 2007/0268133 A1 * | 11/2007 | Sanchez et al. | 340/568.1 |
| 2007/0272746 A1 | 11/2007 | Ortiz et al. | |
| 2008/0145919 A1 | 6/2008 | Franklin et al. | |

FOREIGN PATENT DOCUMENTS

| | | |
|---|---|---|
| JP | 2007-133617 A | 5/2007 |

* cited by examiner

WIRELESS TRACKING SYSTEM AND METHOD WITH EXTREME TEMPERATURE RESISTANT TAG

CROSS REFERENCES TO RELATED APPLICATIONS

The Present Application is a continuation of U.S. patent application Ser. No. 12/325,030, filed on Nov. 28, 2008, which claims priority to U.S. Provisional Patent Application No. 60/991,683, filed on Nov. 30, 2007, now abandoned.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a wireless tracking system and method for a tag subject to extreme temperatures.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects, each of which transmits a signal, multiple receivers for receiving the transmissions from the tagged objects, and a processing means for analyzing the transmissions to determine the locations of the tagged objects within a predetermined environment.

Medical equipment subject to extreme temperatures includes surgical kits or surgical trays which are typically sterilized in an autoclave at high temperatures to destroy any living organisms (bacteria, fungi, viruses and spores). Autoclaves generally use heat and high pressure to destroy the living organisms. These high temperatures are often in excess of 120 degrees Fahrenheit, and as high as 300 degrees Fahrenheit.

The surgical trays are typically composed of stainless steel, aluminum or another metal. Various surgical instruments are contained within the surgical tray. An example of such a tray is disclosed in Wood, U.S. Pat. No. 6,827,913, for a Modular Sterilization Tray Systems For Medical Instruments.

The autoclave sterilization temperatures are far beyond the typically room temperature operating ranges for most RFID tags or similar wireless tracking tags. However, there is a need to track the location of the surgical trays since the ability to monitor the location and the sterilization status of such surgical trays allows a hospital or other like facility to adequately prepare for a surgery procedure.

Nycz, et al., U.S. Pat. No. 7,118,029, for a Smart Instrument Tray RFID Reader, discloses the use of passive RFID tags that are attached to surgical instruments to provide information on the contents of a surgical tray. The RFID tags can be encased in such materials as Phenol, Glass, Wood, Epoxy resin, Silicon, Rubber, Polyvinyl Chloride, Acrylonitrile Butadiene Styrene, common plastic and Styrofoam.

Nicholson, et al., U.S. Pat. No. 6,255,949, for a High Temperature RFID Tag, discloses an RFID tag that is capable of withstanding temperatures of −40 degrees Celsius to 300 degrees Celsius. The tag is placed within a housing composed of a high thermally resistant material such as RYTON PPS compound or TEFLON.

Although the prior art has provided numerous solutions, the prior art has failed to recognize the problems associated with wireless location asset tracking in a temporary high temperature environment.

BRIEF SUMMARY OF THE INVENTION

The present invention has recognized that operating a wireless tracking system in a temporary high temperature environment creates unique problems such as the fact that transmitting while in a high temperature environment such as an autoclave is difficult and would consume too much power of the limited power supply of an active tag.

One aspect of the present invention is a method for real-time location monitoring of an extreme-temperature sterilizable object. The method includes tracking a location of an extreme-temperature sterilizable object bearing a tag. The tag includes a moisture resistant housing composed of an extreme-temperature resistant material, a processor within the housing, a transceiver within the housing for transmitting a radiofrequency signal through the housing and a temperature sensor within the housing and electrically connected to the processor. The method also includes monitoring an internal temperature of the housing of the tag utilizing the temperature sensor. The method also includes detecting an internal temperature outside an acceptable operating temperature range for the tag by the temperature sensor. The method also includes activating a sleep mode for the tag, the sleep mode utilizing minimal tag activity. The method also includes periodically activating the temperature sensor to determine the internal temperature of tag. The method also includes sensing an internal temperature within the operating range for the tag. The method also includes reactivating an operating mode for the tag.

Optionally, the method also includes broadcasting a status signal from the transceiver of the tag to a plurality of network sensors positioned within an indoor facility.

Optionally, the method also includes transmitting the status signal from at least one of the plurality of network sensors to a positioning engine to track the real-time location of the extreme temperature sterilizable object.

Optionally, the method also includes broadcasting a status signal with an extreme temperature signal from the transceiver of the tag to a plurality of network sensors positioned within an indoor facility prior to activating the sleep mode.

The preferred acceptable operating temperature range ranges from 40° F. to 120° F.

The housing is preferably composed of a polyetherimide resin material.

The tracking tag preferably transmits a radiofrequency transmission of approximately 2.48 GigaHertz, and each of the plurality of network sensors communicates utilizing a 802.15.4 protocol.

Optionally, the method also includes sterilizing the extreme-temperature sterilizable object in an autoclave at a temperature exceeding 120° F.

Optionally, the method also includes sterilizing the extreme-temperature sterilizable object in a freezer at a temperature below 32° F.

Another aspect of the present invention is a system for real-time location monitoring of an extreme-temperature sterilizable object. The system includes a plurality of network sensors, a tracking tag and means for processing the signals from the tracking tag. Each of the plurality of network sensors is positioned within an indoor facility. The tracking tag is attached to an extreme-temperature sterilizable object. The tracking tag includes a moisture resistant housing composed of an extreme-temperature resistant material, means for detecting an internal temperature of the tag, means for switching the tag from a operating mode to a sleep mode upon a signal from the internal temperature detection means, and means for wirelessly transmitting to each of the plurality of network sensors a signal that the tracking tag has entered a sleep mode.

The processing means is preferably a remote server in communication with the plurality of network sensors.

Yet another aspect of the present invention is a tag for real-time location monitoring of an extreme-temperature sterilizable object. The tag includes a moisture resistant housing composed of an extreme-temperature resistant material, a processor, a transceiver, and a temperature sensor circuit. The processor is positioned within the housing. The processor is configured to switch the tag from an operating mode to a sleep mode upon an extreme temperature signal. The transceiver is positioned within the housing and transmits a radiofrequency signal through the housing. The temperature sensor circuit is positioned within the housing and is electrically connected to the processor. The temperature sensor circuit is configured to detect an internal temperature outside an acceptable operating temperature range for the tag.

Yet another aspect of the present invention is a tag for real-time location monitoring of an extreme-temperature sterilizable object. The tag includes a housing composed of an extreme-temperature resistant material and an integrated circuit and power supply enclosed within the housing. The integrated circuit includes a microcontroller, a transceiver, a temperature sensor and a motion sensor. The microcontroller is configured to switch the tag from an operating mode to a sleep mode upon an extreme temperature signal. The transceiver is in communication with the microcontroller. The temperature sensor is in communication with the microcontroller and configured to detect an internal temperature outside an acceptable operating temperature range for the tag. The motion sensor is in communication with the microcontroller. The internal power supply is enclosed within the housing and connected to the integrated circuit.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
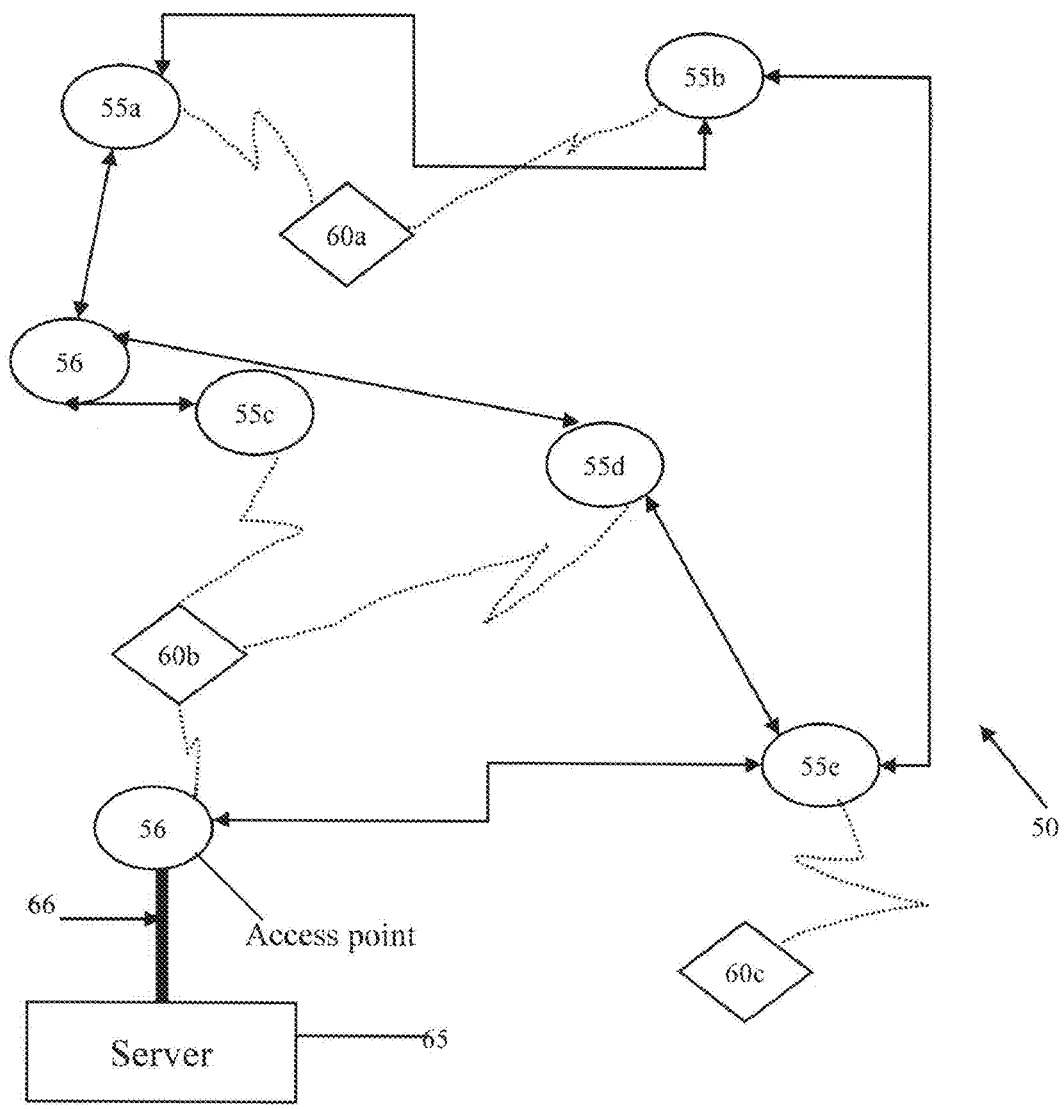
FIG. 1 is schematic view of a wireless asset tracking system.
Figure 2:
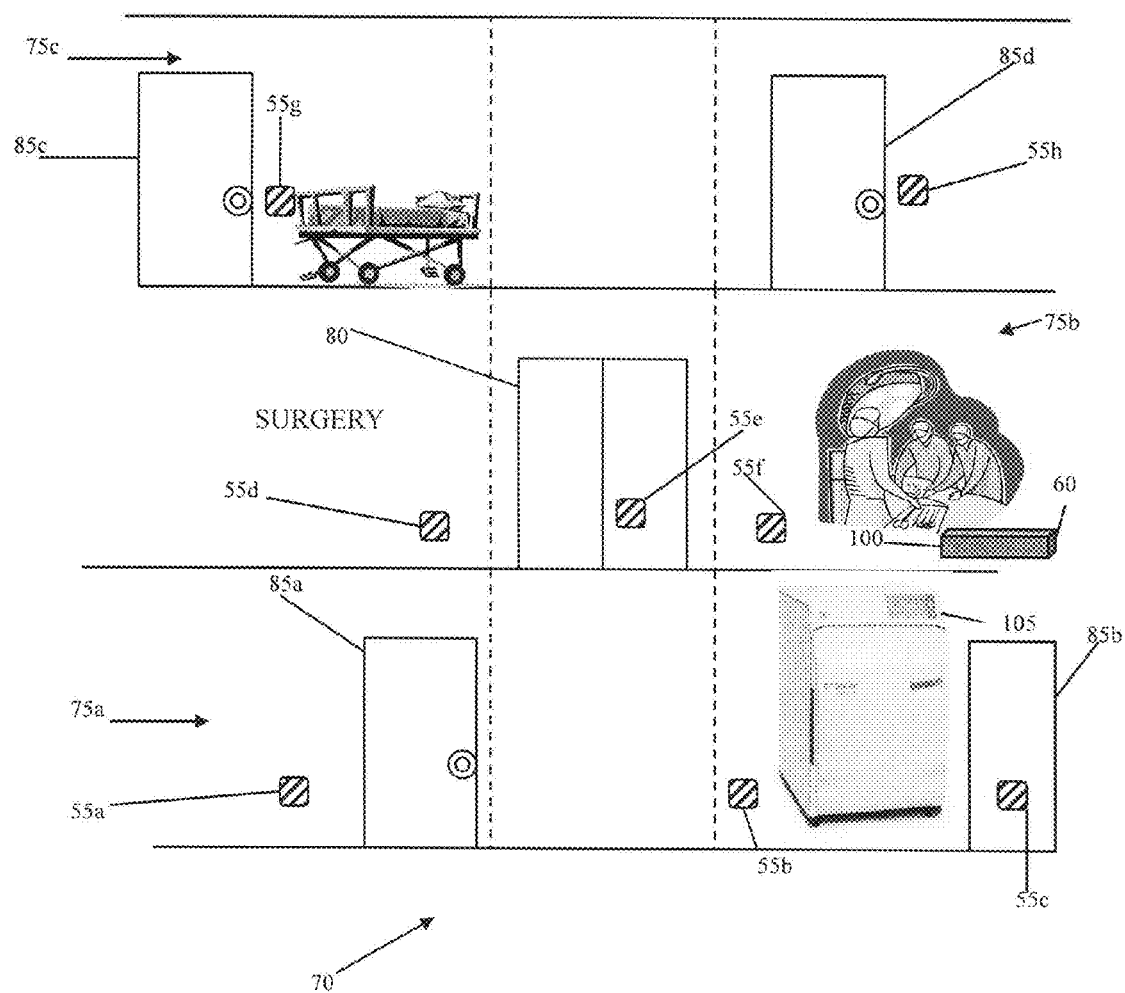
FIG. 2 is a multi-floor view of a facility employing a wireless asset tracking system.

As shown in FIGS. 1-2, a wireless asset tracking system is generally designated 50. The system 50 is capable of determining real-time location of an asset 100 within an indoor facility 70. The system 50 preferably includes a plurality of sensors 55, a plurality of bridges 56, a plurality of tags 60 and at least one server 65. One example of the components of the system 50 is disclosed in Smith et al., U.S. Pat. No. 7,312,752 for a Wireless Position Location And Tracking System, which is hereby incorporated by reference in its entirety. A more specific example of the sensors 55 is disclosed in Smith et al., U.S. Pat. No. 7,324,824 for a Plug-In Network Appliance, which is hereby incorporated by reference in its entirety. Another example of a system 50 is set forth in U.S. Pat. No. 6,751,455 for a Power-And Bandwidth-Adaptive In-Home Wireless Communications System With Power-Grid-Powered Agents And Battery-Powered Clients, which is hereby incorporated by reference in its entirety.

The system 50 is preferably employed within an indoor facility 70 such as hospital or other like facility. The system 50 is utilized to track and locate various assets (objects) positioned throughout the facility 70. The tags 60 preferably continuously transmit signals on a predetermined time cycle, and these signals are received by sensors 55 positioned throughout the facility 70. In a preferred embodiment, the tags 60 transmit a signal every five seconds when in motion, and a signal every ten minutes when stationary. The sensors 55 preferably transmit the data to a bridge 56 for transmission to a server 65. If a sensor 55 is unable to transmit to a bridge 56, the sensor 55 may transmit to another sensor 55 in a mesh network-like system for eventual transmission to a bridge 56. In a preferred embodiment, a transmission can be relayed from a sensor 55 to a bridge 56 up to a transmission distance of six sensors 55 from the bridge 56. The server 65 preferably continuously receives transmissions from the sensors 55 via the bridges 56 concerning the movement of assets 100 bearing a tag 60 within the facility 70. The server 65 processes the transmissions from the sensors 55 and calculates a real-time position for each of the assets 100 bearing a tag 60 within the facility 70. The real-time location information for each of the assets 100 bearing a tag 60 is preferably displayed on an image of a floor plan of the indoor facility 70, or if the facility 70 has multiple floors, then on the floor plan images of the floors of the facility 70. The floor plan image may be used with a graphical user interface so that an individual of the facility 70 is able to quickly locate assets 100 within the facility 70.

Figure 3:
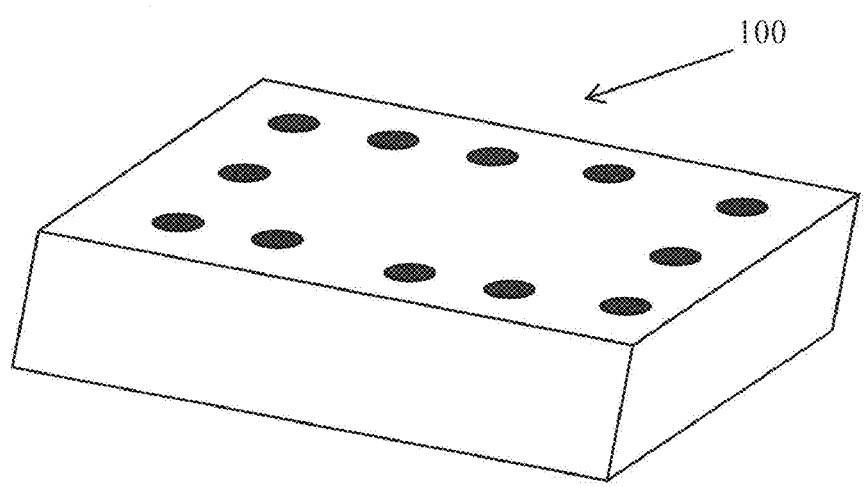
FIG. 3 is an illustration of a surgical tray.
Figure 3A:
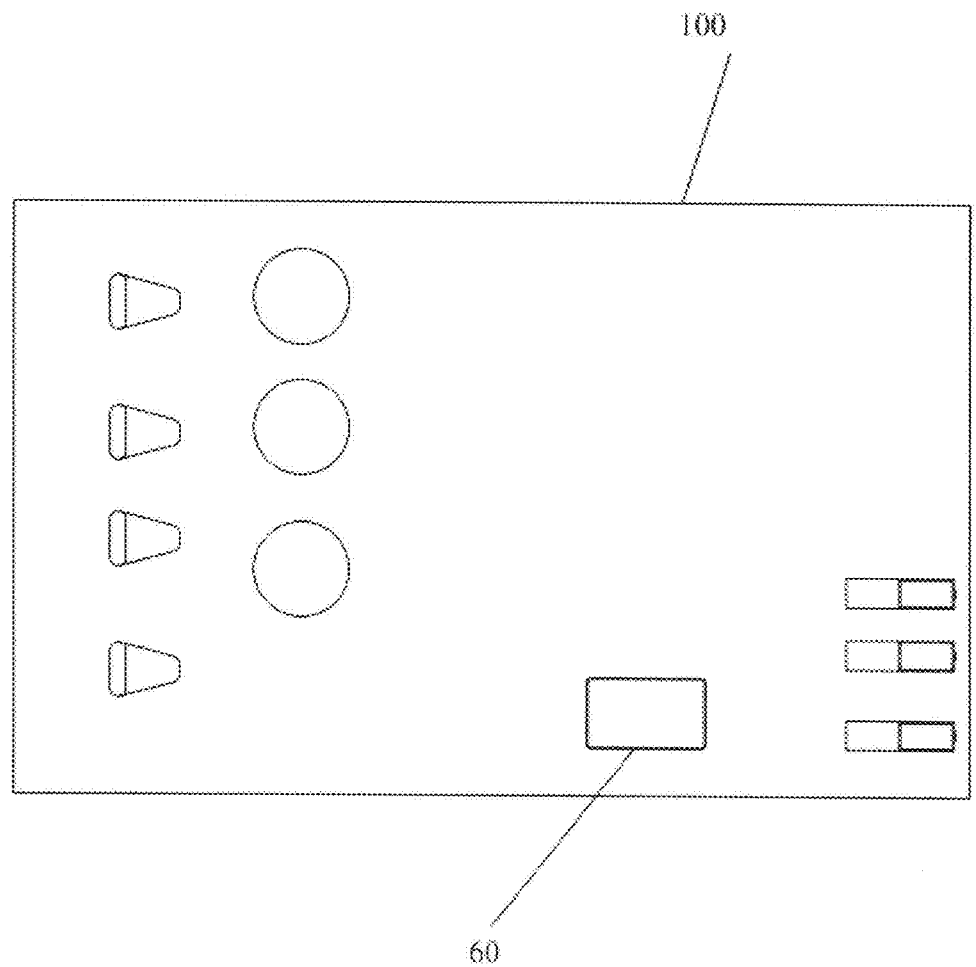
FIG. 3A is an illustration of an interior of a surgical tray.

The assets 100 are preferably items of value to the owners or users of the system 50 and/or the facility 70. In a hospital setting, the assets 100 could include vital sign monitoring devices, kidney dialysis machines, imaging devices, and other like items that are valuable and mobile. In particular for the present invention, the assets 100 include surgical trays which preferably contain surgical instruments, such as shown in FIGS. 3 and 3A.

As shown in FIG. 1, the system 50 utilizes sensors 55 to monitor and identify the real-time position of non-stationary assets 100 bearing or integrated with tags 60. The sensors 55a-f preferably wirelessly communicate with each other (shown as double arrow lines) and with a server 65 through a wired connection 66 via at least one bridge 56, such as disclosed in the above-mentioned U.S. Pat. No. 7,324,824 for a Plug-in Network Appliance. The tags 60a-c transmit signals (shown as dashed lines) which are received by the sensors 55a-e, which then transmit signals to bridges 56 for eventual transmission to a server 65. The server 65 is preferably located on-site at the facility 70. However, the system 50 may also include an off-site server 65, not shown.

Each tag 60 preferably transmits a radio frequency signal of approximately 2.48 GigaHertz ("GHz"). The communication format is preferably IEEE Standard 802.15.4. Those skilled in the pertinent art will recognize that the tags 60 may operate at various frequencies without departing from the scope and spirit of the present invention.

As shown in FIG. 2, the facility 70 depicted is a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility 70 are sensors 55a-o for obtaining readings from tags 60a-d attached to or integrated into non-stationary assets 100. A bridge 56 is also shown for receiving transmissions from the sensors 55 for processing by the server 65. Specifically, a surgical tray 100 is used in surgery. A tag 60 is placed inside the tray 100 in order to track the tray within the facility. The tray 100 is sent to an autoclave 105 on a lower floor of the facility for sterilization subsequent to the surgery procedure. The movement of the tray 100 is tracked by the tag 60 and the tracking system 50 of the present invention.

Figure 4:
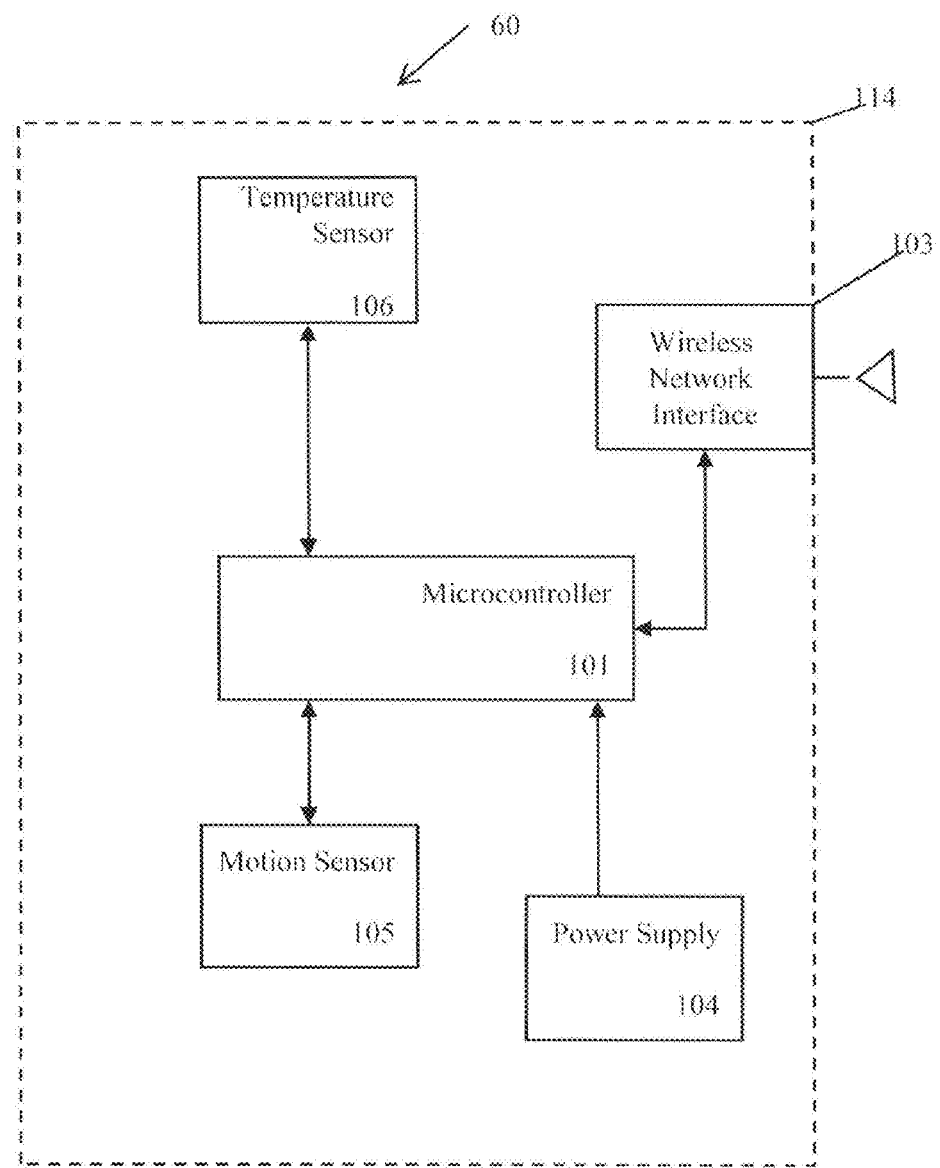
FIG. 4 is a block diagram of a tag.

As shown in FIG. 4, a tag 60 preferably includes a microcontroller or processor 101, a wireless network interface 103 having an antenna, a power supply 104, a motion sensor 105 and a temperature sensor 106. The processor 101 is in communication with the temperature sensor 106, motion sensor 105 and wireless network interface 103. The power supply 104 preferably provides power to the processor 101, the motion sensor 104, the temperature sensor 106 and the wireless network interface 103. The power supply 104 is preferably a battery such as a lithium battery. The power supply 104 is preferably the only source of power for the tag 60. Conserving the energy use of the tag 60 allows the tag 60 to have greater use period before needing to be recharged or replaced.

Figure 4A:
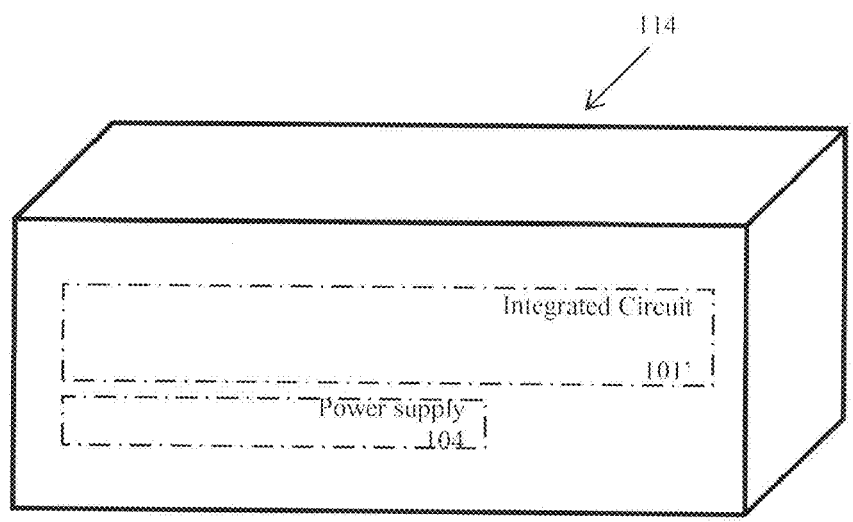
FIG. 4A is a block diagram of a tag with an integrated circuit.
Figure 4B:
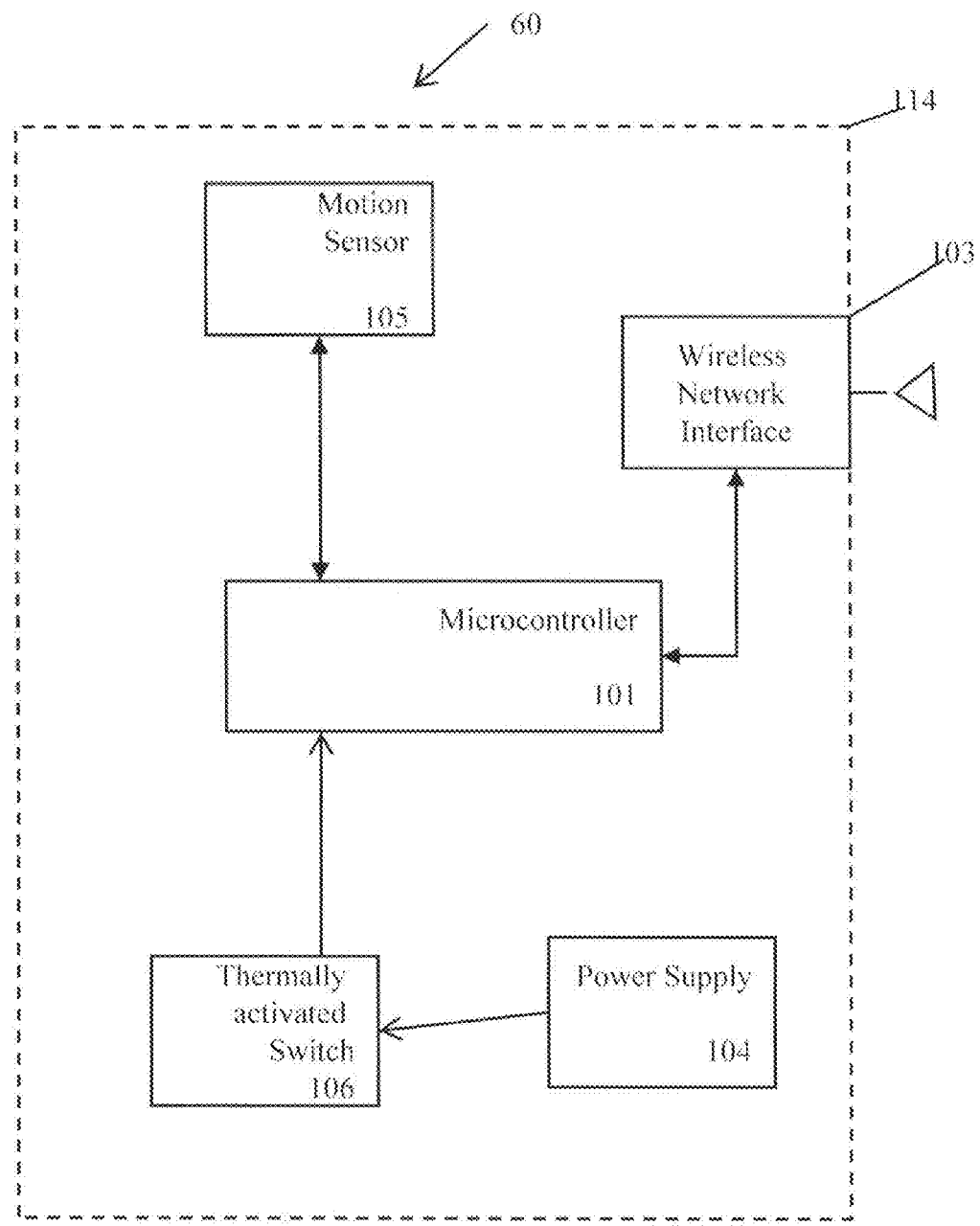
FIG. 4B is a block diagram of an alternative embodiment of a tag with an integrated circuit.

In an alternative embodiment shown in FIG. 4B, the temperature sensor 106 is a thermally activated switch positioned between the power supply 104 and the entirety of the circuit, including the processor 101, the wireless network interface 103 and the motion sensor 105. The temperature sensor 106 preferably comprises a bimetallic switch which is temperature controlled and deactivates the power supply to the entirety of the circuit when the temperature exceeds a predetermined threshold. In operation, the bimetallic switch opens upon the internal housing temperature exceeding a predetermined range/limit thereby interrupting current flow from the power supply (battery) 104 to the entirety of the circuit. The bimetallic switch does not close until the temperature is again within the predetermined range, which is preferably between 40° F. to 120° F.

Preferably the components of the tag are enclosed within a housing 114 indicated by the dashed line. The housing 114 is preferably composed of an extreme temperature resistant and moisture resistant material. A most preferred material is ULTEM polyetherimide resin, available from GE Plastics. The housing preferably has a thickness ranging from 1 millimeter ("mm") to 5 mm, more preferably 1.5 mm to 2.5 mm, and most preferably 2 mm. The electrical components of the tag 60 are preferably contained within the housing 114, and the housing 114 is preferably ultrasonically welded. The housing 114 preferably has dimensions of 1 inch width by 1.6 inches length by 0.5 inch thickness. The housing 114 is preferably pneumatically leak tested to verify the ultrasonic weld.

As shown in FIG. 4A, the tag 60 has a housing 114 with an integrated circuit 101' and power supply 104 therein. The integrated circuit 101' preferably includes a microcontroller or processor, a wireless network interface having an antenna, a motion sensor, a temperature sensor, and an analog-to-digital converter. In a most preferred embodiment, the electrical components of the tag 60 are on a single integrated circuit such as a CC2430 from Texas Instruments. The CC2430 preferably has a current consumption of 27 milliamps during transmitting and receiving, and a 0.3 micro-amp consumption in a sleep mode. Those skilled in the pertinent art will recognize that other integrated circuits may be used without departing from the scope and spirit of the present invention.

Reducing the power consumption of the tag 60 is an important aspect of the present invention. Typically, an asset 100 bearing a tag 60 is in motion ten percent of the day. When in motion, the tag 60 preferably broadcasts a status signal every five seconds. Typically, ninety percent of the day, the tag 60 is motionless and broadcasts a status signal every ten minutes. Those skilled in the pertinent art will recognize that the broadcasts from the tag 60 may vary without departing from the scope and spirit of the present invention.

The temperature sensor 106 preferably measures the temperature of the interior of the housing 114 in which the electrical components of the tag 60 are located. When the temperature sensor 106 detects an extreme temperature, the microcontroller deactivates the electrical components of the tag 60. A preferred extreme temperature threshold is 120 degrees Fahrenheit. When the tag 60 is in the deactivation mode, the temperature sensor is preferably the only operational component. Preferably every eight minutes, the temperature sensor awakes from a sleep mode and measures the temperature of the interior of the housing 114. If the temperature is still outside of an acceptable operating range, the temperature sensor 106 returns to a sleep mode. If the temperature is within an acceptable operating range, the microcontroller reactivates the other electrical components of the tag 60.

Figure 5:
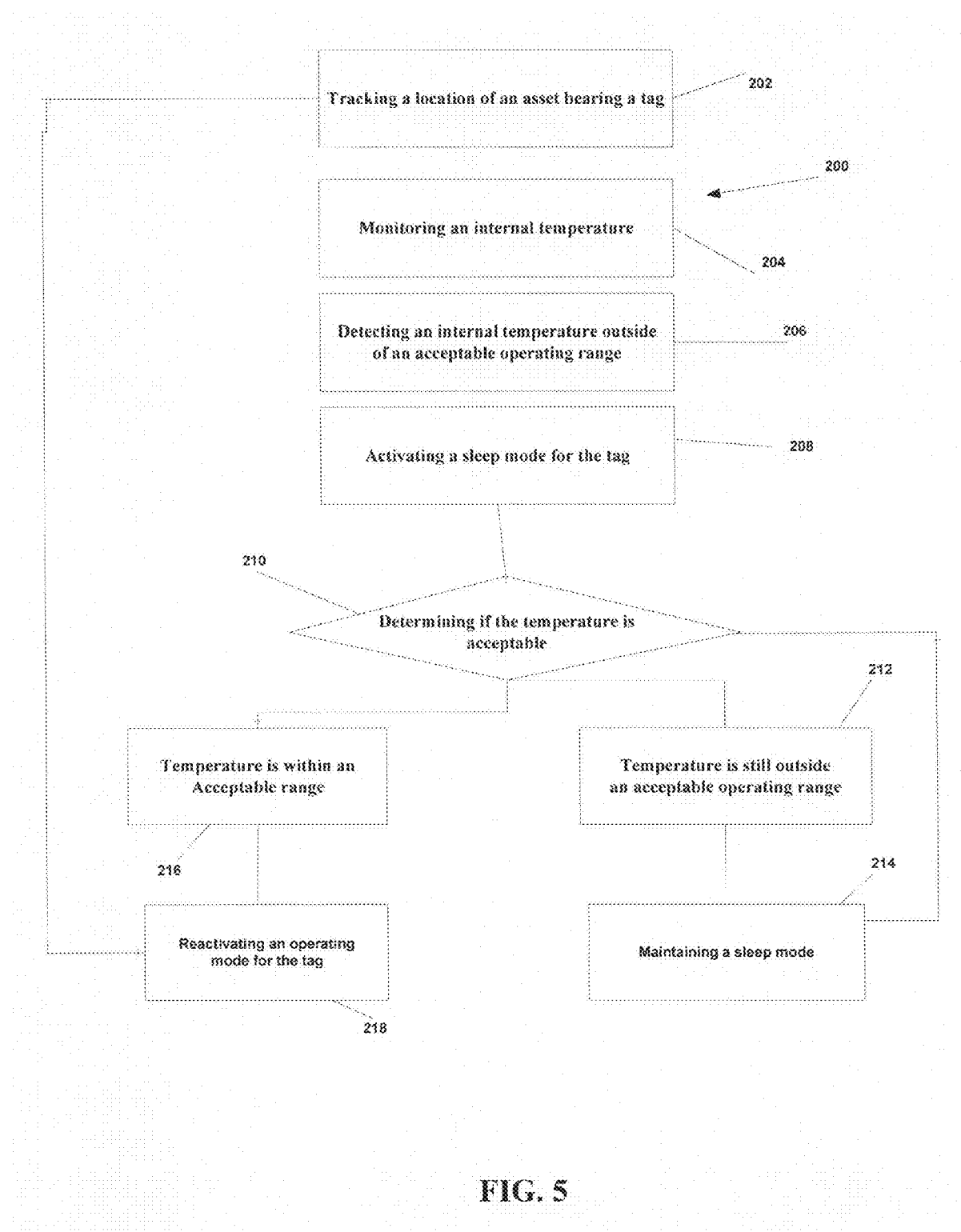
FIG. 5 is a flow chart of a method of the present invention.

A method 200 of the present invention is illustrated in FIG. 5. At block 202, the tracking of a location of an asset 100 bearing a tag 60 is performed by the sensors 55 of the system 50 which receive readings from each tag 60. For location tracking, a sensor 55 receives a signal which includes reading inputs from a tag 60. The reading inputs from the tag 60 preferably include the tag identification, the signal strength, the link quality, the time of the reading, and the internal temperature of the tag, all of which are inputted as a single sensor reading. In this manner, the system is able to track the location of the asset 100 bearing the tag 60. At block 204, an internal temperature of the tag is monitored by the temperature sensor 106. At block 206, an internal temperature outside of an acceptable range is detected by the temperature sensor 106. At block 208, a microcontroller activates a sleep mode for the tag, which deactivates all of the electrical components of the tag 60 except for the temperature sensor 106 which periodically activates to measure the internal temperature. At decision 210, the temperature sensor 106 determines if the internal temperature is within an acceptable range. If the internal temperature is still outside of an acceptable operating range at block 212, then at block 214 the sleep mode is maintained for the tag 60. If the internal temperature is within an acceptable range at block 216, then at block 218 the microcontroller reactivates an operating mode for the tag 60.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for real-time location monitoring of a sterilizable object subjectable to abnormal temperature during a sterilization process, the method comprising:
   tracking a location of a sterilizable object bearing an RFID tag;
   detecting an internal temperature of the tag exceeding an acceptable operating temperature range for the tag, the acceptable operating temperature for the tag ranging from 40° F. to 120° F.;
   activating a sleep mode for the tag responsive to said detecting;
   determining an internal temperature of the tag within the operating range for the tag; and
   reactivating an operating mode for the tag responsive to said determining.

* * * * *